US011301540B1

(12) United States Patent
Boteanu et al.

(10) Patent No.: US 11,301,540 B1
(45) Date of Patent: Apr. 12, 2022

(54) REFINED SEARCH QUERY RESULTS THROUGH EXTERNAL CONTENT AGGREGATION AND APPLICATION

(71) Applicant: A9.com, Inc., Palo Alto, CA (US)

(72) Inventors: Adrian Boteanu, Somerville, MA (US); Michael James Morris, Boston, MA (US); Joshua Christian Snyder, Somerville, MA (US); Adam Kiezun, Belmont, MA (US); Gaurav Gupta, Bellevue, WA (US); Shay Artzi, Brookline, MA (US)

(73) Assignee: A9.com, Inc., Palo Alto, CA (US)

( * ) Notice: Subject to any disclaimer, the term of this patent is extended or adjusted under 35 U.S.C. 154(b) by 30 days.

(21) Appl. No.: 16/351,320

(22) Filed: Mar. 12, 2019

(51) Int. Cl.
| | | |
|---|---|---|
| *G06F 16/908* | (2019.01) | |
| *G06F 16/951* | (2019.01) | |
| *G06F 16/955* | (2019.01) | |
| *G06F 16/957* | (2019.01) | |
| *G06F 16/958* | (2019.01) | |
| *G06F 40/205* | (2020.01) | |
| *G06N 3/02* | (2006.01) | |
| *G06N 5/02* | (2006.01) | |
| *G06Q 30/06* | (2012.01) | |

(52) U.S. Cl.
CPC ......... *G06F 16/972* (2019.01); *G06F 16/908* (2019.01); *G06F 16/951* (2019.01); *G06F 16/9566* (2019.01); *G06F 16/9574* (2019.01); *G06F 40/205* (2020.01); *G06N 3/02* (2013.01); *G06N 5/02* (2013.01); *G06Q 30/0643* (2013.01)

(58) Field of Classification Search
CPC .... G06F 16/972; G06F 40/205; G06F 16/951; G06F 16/9574; G06F 16/9566; G06F 16/908; G06N 5/02; G06N 3/02; G06Q 30/0643
See application file for complete search history.

(56) References Cited

U.S. PATENT DOCUMENTS

| | | | | |
|---|---|---|---|---|
| 9,043,919 | B2 * | 5/2015 | Wyatt | ................... G06F 21/564 726/25 |
| 9,798,820 | B1 * | 10/2017 | Premont-Schwarz | ...................... G06F 16/9535 |
| 2001/0014868 | A1 * | 8/2001 | Herz | ....................... G06Q 30/02 705/14.38 |
| 2006/0271524 | A1 | 11/2006 | Tanne et al. | |
| 2007/0239710 | A1 * | 10/2007 | Jing | ...................... G06F 16/951 |
| 2009/0012842 | A1 * | 1/2009 | Srinivasan | .............. G06F 40/30 705/12 |

(Continued)

*Primary Examiner* — Jorge A Casanova
(74) *Attorney, Agent, or Firm* — Hogan Lovells US LLP

(57) ABSTRACT

Systems and methods are disclosed for refining the accuracy of network searches by supplementing existing keywords and key phrases in an e-commerce catalog or other database with aggregated and analyzed additional, external data. The internet or another network can be crawled for identifiers which point to entries in the catalog or other database, and, subject to third-party use restrictions, data and metadata can be extracted to enrich the existing keywords and key phrases. The extracted external content may be processed by machine learning techniques in order to find similar entries in the original catalog or database. Categorizing and indexing the entries further improves search recall, including clustering via processing word embeddings.

16 Claims, 9 Drawing Sheets

(56) References Cited

U.S. PATENT DOCUMENTS

| | | | |
|---|---|---|---|
| 2009/0171680 A1* | 7/2009 | Wiesinger | G06Q 30/02 705/346 |
| 2009/0319449 A1* | 12/2009 | Gamon | G06F 16/94 706/12 |
| 2010/0094723 A1* | 4/2010 | Johnson | G06Q 30/06 705/26.1 |
| 2011/0035288 A1* | 2/2011 | Clyne | G06Q 30/0275 705/14.71 |

* cited by examiner

REFINED SEARCH QUERY RESULTS THROUGH EXTERNAL CONTENT AGGREGATION AND APPLICATION

BACKGROUND

In the present "information age," be it for some sort of research or simply as part of online shopping, there is increased demand for accurate searches of information over a network, such as the internet. Online shopping in particular, whether for physical items or services such as media content, has become increasingly popular, both for the convenience it provides as well as the large selection of offerings available. As the number of users viewing information and making purchases electronically continues to grow, there is a corresponding increase in the number of e-commerce platforms and electronic marketplace-type sources for products and services. Despite the availability of a wide array of products and services and despite being open to recommendations, a customer may wind up purchasing products and services haphazardly, without full knowledge of the set of available offerings.

Typically, an offering in a product or service online catalog will have certain words and phrases, known as keywords, associated with it. Search queries, entered by prospective customers or other interested parties, which include those keywords will surface the product or service on the seller's website. However, the keywords are limited in that they are typically only extracted from product or service descriptions and keywords provided by manufacturers, publishers, sellers, and other vendors. And it is entirely possible that a potential customer will not enter seller or manufacturer keywords when formulating a search. Of course, just as prospective customers desire more relevant searches, e-commerce site operators seek customer retention in the interest of both sales and advertising revenue, and supplementing an online seller catalog with as much keyword and other data would prove beneficial.

BRIEF DESCRIPTION OF THE DRAWINGS

Various embodiments in accordance with the present disclosure will be described with reference to the drawings, in which.

DETAILED DESCRIPTION

Figure 1:
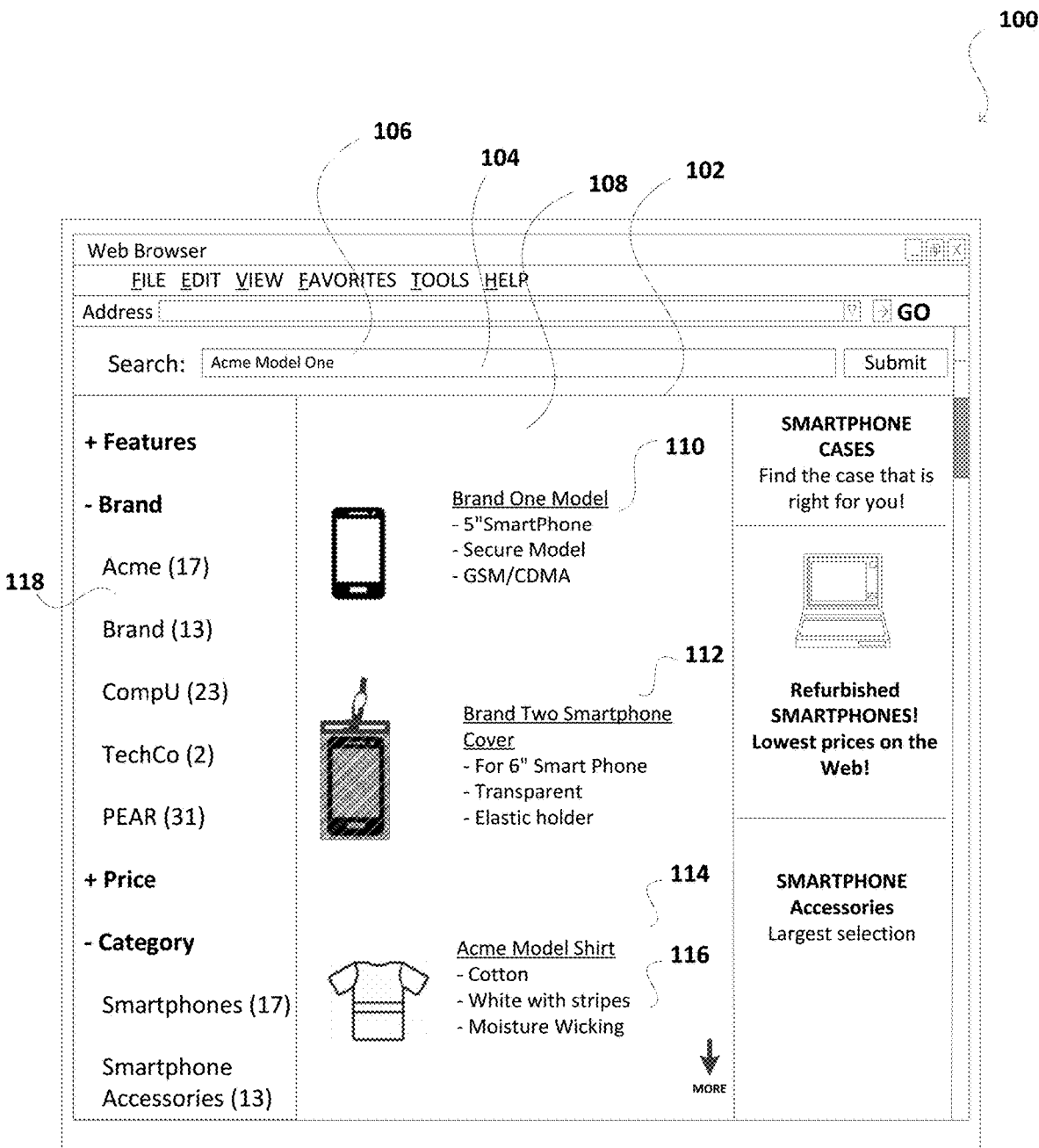
FIG. 1 illustrates an example of a window of display content that can be presented in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to searching for information over a networked electronic environment. In particular, systems and methods herein are capable of enriching, refining, categorizing, indexing, and otherwise improving the accuracy of network searches by supplementing existing keywords and key phrases, in an online, e-commerce catalog or any other database, with aggregated additional, third-party, external content data, such as applicable words and phrases identified and extracted over the internet.

As has become familiar, a prospective customer browsing an e-commerce site or other online marketplace may enter a word (or phrase) in a search engine text box; if the word matches an indexed keyword in the seller's search database, the relevant offering tied to the keyword is considered for retrieval and presentation to the customer as a search result. Of course, ranking or confidence signals are often applied to improve relevance of the search results presented to the customer. However, it is quite possible that the customer will enter one or more keywords not linked to a particular seller offering. This is where, as disclosed herein, the internet and its vast resources can be used by the seller to enrich search results presented to the customer.

While the term "external content" is used herein solely for purposes of brevity, the term is not at all meant to be limiting and can apply to any instance of data or information external to an entity offering query functionality through a search engine database. Likewise, the term "customer" in the present disclosure is all-encompassing and not limiting, and it can include any sort of querying user. In an aspect, identifiers, such as hyperlinks to a manufacturer's or retailer's product release webpages, are used as a basis to crawl and analyze websites, web pages, hypertext documents, and all other content available over a network which is external to the page having a search query interface. Such external content, when found, is likely to include new descriptions and other details for the content that may be the subject of, or otherwise responsive to, customer or other search queries received by a website. The computer systems may be configured to index one or more of the identifiers and the related external content or a portion of the information contained therein. Then, the website receiving the content query is able to be responsive and generate display content incorporating the new content (e.g., the identifier, the related content, or the portion of the information contained therein as part of the search results). Various other functions can be implemented within the various embodiments as well, as discussed and suggested elsewhere herein.

FIG. 1 illustrates an example of search display content 102 that can be presented in an application 100 on a screen of a computer in accordance with various embodiments. In an example, the display content 102 is a window, a website, or application screen of a web browser or a stand-alone application for interacting with the display content and for executing dynamic scripts within the display content. A user, such as a potential customer, may search or interact with the display content via a search field 104. The desired content, which is the subject of the search queries from a customer, can be products, items, services, electronic media, information, or any other searchable form of data. A query 106 is provided in the search field 104 in one implementation of the searching or the interaction with the display content 102. When the submit option is selected, the search may be initiated and processed on the host device computer or on a server as discussed subsequently in this disclosure. In example 100 of FIG. 1, a query 106 for "ACME MODEL ONE" is entered into the search field 104, and the display content is provided with a results section 108, in a form such as a webpage or display content 102. As illustrated, there are three search results 110-114 in the display content, with an indication (e.g., the down arrow with text "MORE" at the bottom of the page or the grey scroll indicator on the right of the page) of additional search results being available. The display content may each include summary specifications as shown, for example result 114, by reference numeral 116. Categories within the display content are presented on one side 118 of the search results, while sponsored content may be displayed in other available areas.

Figure 2:
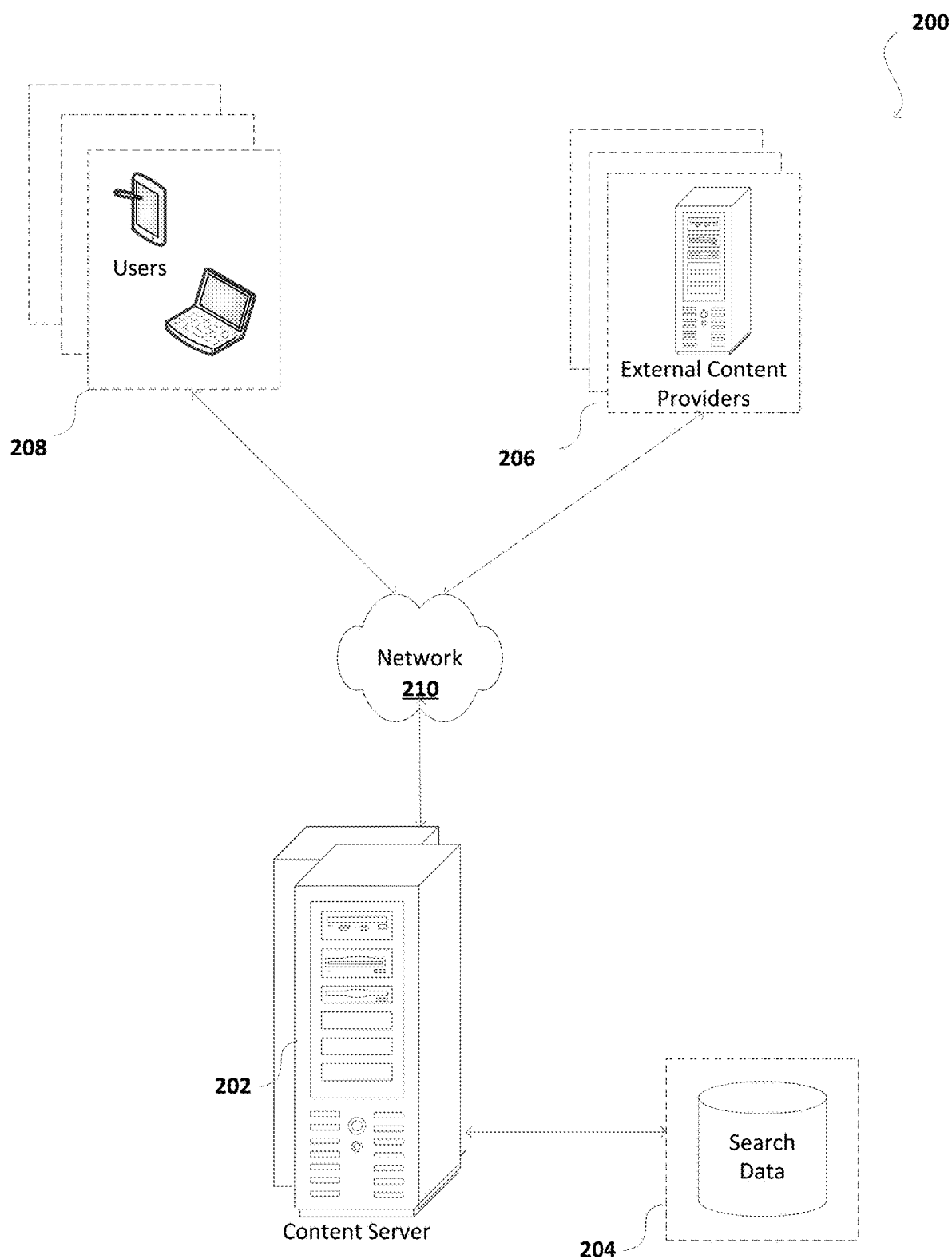
FIG. 2 illustrates an example system architecture for performing the disclosed embodiments in accordance with an aspect of this disclosure.

FIG. 2 illustrates an example system architecture 200 for performing the disclosed embodiments in accordance with aspects of this disclosure. The example environment 200 may include computing components and network relationships that are applicable for providing the content in the webpage or display content 102 of FIG. 1. The example environment 200 includes a seller host device such as a content server 202 for serving content in response to a search 104 or interaction on the webpage or display content 102; a search engine database 204 for storing content from external content providers 206 (e.g., product information, service information, advertisements, news, social media, and other product/service related content from which information is gleaned for use in the present system). Further, customers or other client-side users with computing devices 208 may send queries or interact with the content server 202 over a network 210 to access digital information for products and services that may be referred to or available for purchase via the content server 202. While the term "host device" appears herein solely for convenience, the term is non-limiting and may include multiple devices, servers, and the like, including or not including databases and data stores, used by an online seller or other entity offering search functionality.

External content providers 206 are able to utilize respective computing systems and/or devices capable of interacting with the content server 202 through the network 210, be it a local area network ("LAN") or wide area network ("WAN"), e.g., the internet. For example, content providers 206 can provide content (e.g., web pages and product information) that is accessible over the network 210. In an illustrative implementation, the content server 202 hosts its own services for utilizing content of the external content providers 206, such as in the course of operating electronic marketplace. The computing devices and/or systems for each of the content server 202, external content providers 206, and the user client devices 208 will each generally include memory, for storing instructions and data, and at least one processor for executing the stored instructions that configure the computing devices and/or systems to perform the features disclosed. As discussed herein, the external content providers' websites or web-enabled applications may offer opportunities to present additional information useful to the seller conducting e-commerce using a searchable online catalog.

When a customer with a client device 208 uses that computing device to access content from a host device such as the content server 202, the content server 202 can send responsive content to the computing device 202. This access for content can include various requests or searches to find specific content hosted by the content server 202. Further, content server 202 may be a special status host and may have special access ability to index, as discussed herein, content from various external content providers 206. The process allows at least a portion of new external content to be indexed to provide sufficient new information to interested parties in future searches via content server 202. Content server 202 may include cookies, authentication certificates, or signed certificates to enable access to protected hosted content.

Figure 3:
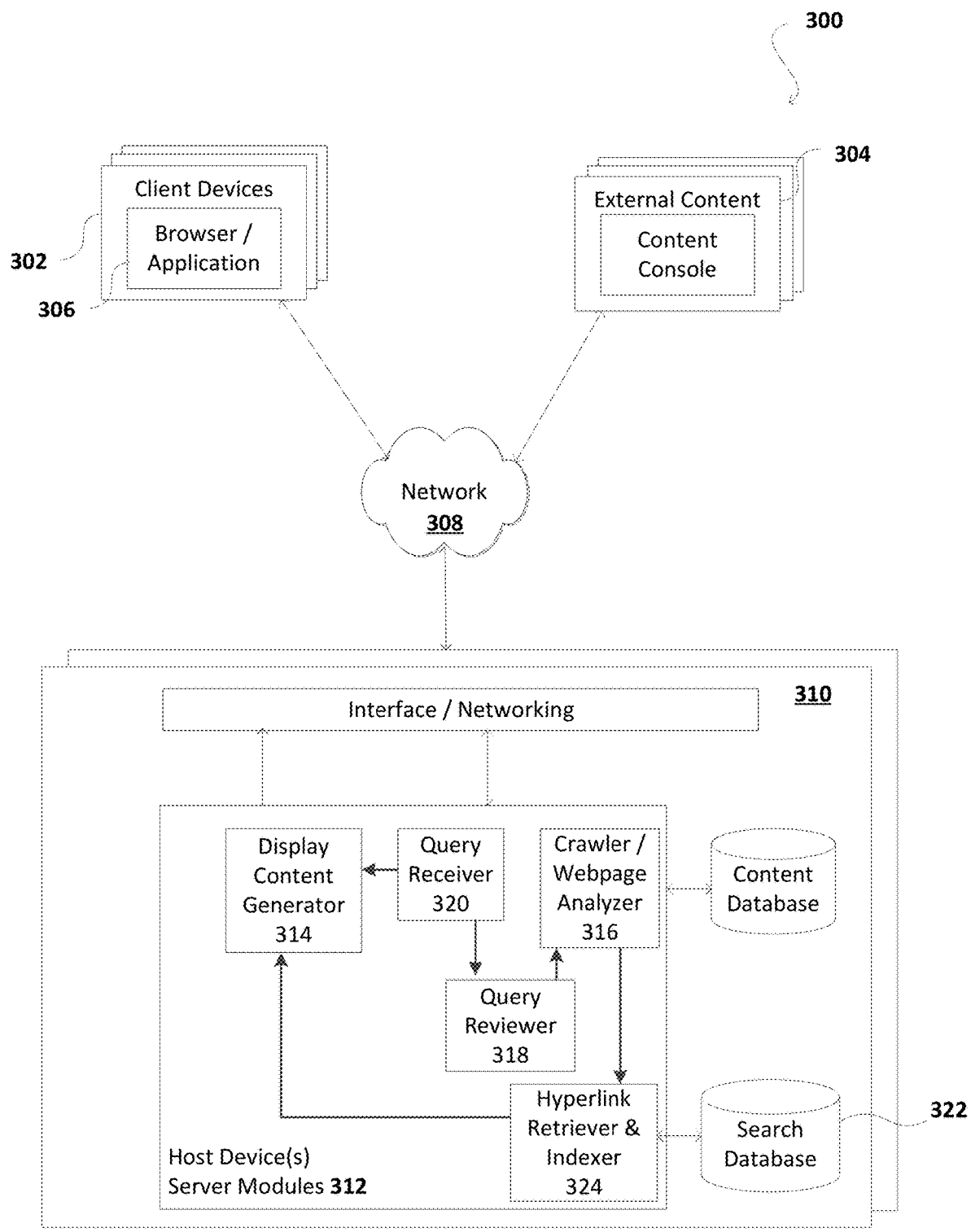
FIG. 3 illustrates another example system architecture for performing the disclosed embodiments in accordance with another aspect of this disclosure.

Detailed further in the example architecture 300 of FIG. 3, client devices 302 and content provider devices 304 can include any processor and memory-based electronic devices with capabilities as disclosed herein, but at least with the capability to execute computer-readable instructions in a browser or to execute computer-readable instructions with or without a browser. These electronic devices are described in detail below and include specific configuration to perform the functions herein. Such electronic devices may include personal computers, tablets, ultrabooks, smartphones, cell phones, wearable watches and related devices, handheld messaging devices, laptop and notebook computers, video game consoles, set-top boxes, personal data assistants, electronic book readers, and the like. Users or consumers of electronic or online products and/or services utilize the client devices 302 to interface with a device hosting a web site providing content. Each of these electronics devices may be configured to include a browser or a stand-alone application 306 that is capable of being configured and conducting searches in the manner of this disclosure.

Network 308, again, can include any appropriate network, including the internet or any other WAN, an intranet or any other LAN, a cellular network, or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such system architecture 300 can depend at least in part upon the type of network and/or environment selected. Protocols and components for communicating via such a network 308 are well-known and will not be discussed herein in detail. Communication over the network 308 can be enabled via wired or wireless connections and combinations thereof. In this example, a seller content server 310 may include one or more local servers in communication with each other and with other remote servers via the network 308. In an example, the content server 310 includes a web server for receiving requests from the client devices 302 and extracting content from the external content providers 304. In response thereto, although for other networks, an alternative device serving a similar purpose as any one of the content server 310 could be used, as would be apparent to one of ordinary skill in the art upon reading this disclosure. One or more components or modules in system architecture 300 may also be virtual machines or operate in a virtual environment for performing one or more of the features disclosed herein.

Per the example architecture 300 of FIG. 3, real-time or dynamic search results are provided for queries from the client devices 302. For example, queries are addressed in real-time or dynamically via the host device server modules 312, which may include machine learning capabilities and a display content generator 314. Modules 312 and 314 may cooperatively function under two or more modes. In one of the modes, machine learning features of select modules 312 (e.g., crawler/webpage analyzer 316 and query reviewer 318) may constantly improve using each new query and newly-received external content as feedback to their respective machine learning algorithms to ensure a robust functionality; such a mode may be referred to as a training mode. In an application of neural networks for the machine learning operations, the machine learning aspects of these modules may train one or more neural networks with each new query and newly-modified content while running active operations with a copy of an active previously-trained neural network. Once the new query and new external content has been trained to one or more inactive neural networks, the one or more inactive neural networks may be activated and the previously-trained neural networks may be inactivated for training. Alternatively, bulk queries and modified content are available to train one or more neural networks during an assigned downtime. In content server 310, the queries from client devices 302 may be received via module 320. Results webpage(s) or display content is generated by module 314. In an example, the display content generator 314 is a module that includes Hypertext Markup Language ("HTML") and various dynamic scripts that are formatted for rendering on the client device 302.

Millions upon millions of third-party websites and web pages, including web logs ("blogs"), are dedicated to posting about, reviewing, detailing use cases, sharing opinions, linking to, and otherwise describing product and service offerings. These websites and web pages, external to a seller, are a noteworthy source of external content, as they present a product or service in a different light, cast it in different terms, and the like. Such external content can enhance a seller's online catalog and the usefulness thereof, as it provides different keywords and other details about, or at least a different view of, the subject offering. For example, an online review may suggest that a specific product, such as a type of shoe, is exceptionally good for a certain activity, such as mountain climbing, which has not occurred to the seller and is not reflected in the seller's search engine database and online descriptions of the product. Further, these third-party web pages can assist in grouping offerings for a certain theme or event, such as suggested items for a particular type of vacation a customer will be taking. This sort of enhancement for the seller's catalog increases the likelihood that a potential customer's search will yield the desired offering. Similarly, even when a customer is merely browsing by category, external content-type data can help ensure that the product or service categories are as accurate as possible. Otherwise, the relevance of search results 110-114 may be limited to situations where the seller currently employs keywords and key phrases used by the searching customer.

Using identifiers, the present systems and methods can extract external content, such as data and metadata in the form of keywords and other identifiers, by crawling external websites and web pages which review and link to offerings on e-commerce and other online marketplace sites. Identifiers can include concepts such as unique character-based identifiers, hyperlinks or Uniform Resource Identifiers ("URIs") such as Uniform Resource Locators ("URLs") and Uniform Resource Names ("URNs"). The external content can, in turn, be applied to the seller's online catalog. For the avoidance of doubt, the term "keyword" is used herein merely for convenience and is not meant to be limiting in any way, and the term encompasses key phrases and verbiage of any sort in any sort of information setting, not just the internet or the "cloud." Similarly, other terms such as "seller" are in the interest of brevity, but the subject matter herein applies to virtually any sort of information search and retrieval setting, not just e-commerce. The systems and methods may be applied to any external website on which a corpus of data from any site can be identified either from links, text, or images. Archived record and research-intensive spaces, such as the medical record and technical literature fields, could benefit, as can collaborative websites (i.e., "wikis") on which users modify content and structure directly from their web browsers, to name a few of countless examples.

The refinements through external content extracted by the systems and methods herein may include new grouping labels for products, such as interests, occasions, styles, or other subjective assessments of the product. This allows, say, an e-commerce website to find new groupings of products that are relevant to its customers. This new set supplements existing manual processes of defining product categories and their refinements that the seller implements. An e-commerce site which does not extract data from the internet in such fashion cannot achieve this level of relevance by indexing only keywords from manufacturer specifications.

Commonly, the external content pages will have some sort of affiliate relationship with a seller's online shopping website and be incentivized via commissions to link to the seller's catalog, but the systems and methods herein are not limited to such a scenario and may be applied to any website or web page on which, via existing direct or indirect (such as through a competitor site) links or via automated discovery methods, it is possible to identify offerings from a seller's catalog or other collection of information. Thus, in some illustrative embodiments, a seller may opt to peruse only the affiliate domains.

In some illustrative embodiments, a step is to "harvest" or "scrape" the internet 308 and extract external HTML content such as text, hyperlinks, and images. A hyperlink retriever module 324 can assist in this regard. When external content 304 in the form of a hyperlink is scraped, it can be ascertained whether a third-party product or service description is linked (directly or indirectly) to the seller's offering web page. Text on the third-party page can be beneficial, be it all of the text (including a title) or the text surrounding the hyperlinks, as it can be employed by the seller as keywords in relevant entries in its search engine database and/or simply used to link to other seller-affiliated sites. A set of common keywords and key phrases of which the seller is already aware can assist in targeting the crawling, as can third-party, general purpose search engines. Manufacturer websites could provide additional data for crawling and potential extraction. A seller need not select in advance the sites and web pages to be crawled. In theory, the entire internet 308 could be scanned for links to the seller's online catalog or references to a seller's offerings, although such an effort would prove laborious and resource-consuming.

To accomplish internet 308 navigation for external content 304 harvesting or scraping purposes, any number of techniques may be used, alone or in combination. As known to those in the computing sciences, such scraping, and the navigation requisite for same, can be accomplished by a web crawler or robot ("bot") capable of automatically executing designated tasks. Direct links to partner and/or other affiliate sites would work to lead to useful external data without needing web crawling and searching.

With regard to identifying relevant keywords and key phrases appearing in content on external content 304 websites and web pages, as will be seen, the systems and methods herein can employ a wide range of automated techniques, including natural language processing and information extraction schemes known in the computing sciences and information retrieval arts. These techniques include pattern extraction and text summarization of the website's title, text content, data, metadata, or any other data on the site of potential interest to a seller, in addition to web-search keywords that lead to the third-party website. The identified keywords on the external content 304 web pages can then serve as grouping criteria, or at least search query keyword refinements, on a seller's website.

More particularly, associating keywords with metadata involves two tasks: (i) finding keywords, and (ii) matching the found keywords with product-identifying metadata. The ways to find keywords or key phrases on a web page is not limited and may be accomplished by all sorts of means known to those in the computing art. Manual rules for known data can be used with elements such as a page title and paragraph headers based on HTML markup. The term frequency-inverse document frequency ("TF-IDF") weighting algorithm can be applied to a collection of web pages, for purposes of selecting descriptive phrases. Shallow parsing is capable of extracting patterns based on the part of speech (e.g., adjective-noun pairs of words). Thesauri and word clustering, such as word/phrase embedding cosine similarity, may identify words on a page that are similar to words already indexed in a seller's product catalog (e.g., a seller, already having indexed "trekking," might discover the similar word "hiking" on a third-party web page and utilize that word to enhance the seller's search engine database 322).

Product references may be found in the external web page text through entity matching, and associations and relations can be ascertained and extracted from the surrounding text. Machine learning can assist and optimize such relationship extraction. For example, neural network, deep learning, and other machine learning techniques can be applied to train a model used to generate, hone, and/or optimize the search query enhancement hereunder, through collection and application of external content data and metadata. Such collected data and metadata will allow the systems and methods herein to "learn" meanings from identifiers, keywords, key phrases, and the like, in order to automatically maximize a seller's search engine database 322 and offer the end-user customer more better-targeted search query results. In some configurations, neural network techniques may be applied for purposes herein that include training a recommendation system for product or service identifier recognition and external content extraction. Generally speaking, in the training context, one or more algorithms are applied to a training data set of sample content to "learn" to inspect for identifiers in particular areas and what meanings can be gleaned from the extracted external content and "learn" what to label that feature; a deep learning network is then trained to perform such inspection and defining.

As is known in the neural network and artificial intelligence arts, a variety of neural network types could be applied, including, but by no means limited to, feedforward, recurrent, radial basis function, modular, and self-organizing neural networks. Prior to production environment use, a non-production sample data set may be employed for training a neural network model. The systems and methods can use a beam search or other algorithm to efficiently rank the extracted external content, and optimizations in some embodiments are made to a predictive system so that the optimized recommendations can be made in real time. Although graphics processing units ("GPUs") are effective for many deep learning neural network applications, the present systems and methods can be used with GPU-based or central processing unit ("CPU")-based systems. In an implementation, the machine learning aspect is performed in a continuous manner.

More particularly, with the emergence of the deep convolutional neural network ("CNN"), a programming and information processing paradigm allowing a machine to learn from data, object detection performance has improved significantly. CNNs are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer, which along with a set of adjacent layers, forms the convolution portion of the network. The bottom layer of the convolution layer, along with a lower layer and an output layer, makes up the fully-connected portion of the network. A number of output values can be determined from the output layer, which can include several items determined to be related to an input item, among other such options.

Well known in the art, a CNN was first proposed to use a convolutional network as a visual classifier for proposals of objects that may be in media content. More recently in the art, several algorithms take a further step toward single-stage object detection, without using object proposals, achieving some success in better computation efficiency and competitive detection performance. Still, a two-stage object detection framework integrates the object proposal stage into a CNN and trains the processing pipeline, end-to-end, obtaining state-of-the-art performance.

When associating keywords with metadata, the other task in some embodiments entails matching found keywords with product-identifying metadata and can involve all or just some of the external content 304 on the third-party page. By way of but one example, the third-party data and metadata extraction can involve the use of an identifier in the form of metadata such as the Amazon Standard Identification Number ("ASIN"). The ASIN is a ten-character alphanumeric unique identifier assigned by Amazon.com and its partners for product identification within the Amazon organization. For example, what is in a web page title may be relevant for all ASINs, but keywords extracted from a single paragraph may only be relevant for ASINs mentioned in that paragraph. To identify ASIN mentions, one could use steps such as: direct links to Amazon; indirect links via competitor web sites that are then translated to Amazon offerings; or natural language processing ("NLP") methods which can infer a mention by matching offering names, matching common alternative names and/or abbreviations, resolving anaphoras or the lack thereof, and the like. It should be noted that the techniques described may be applied to all sorts of identifying data and metadata in addition, or as an alternative to, the ASIN. Similarly, any sort of model number may be employed in seeking to establish a relationship between data on third-party sites and entries appearing in a seller's catalog and search database 322.

Importantly, as a best practice, a seller, or any other entity, crawling and extracting data pursuant to techniques herein should always adhere to content licensing and copyright restrictions on the external websites 304. Systems and methods can even be configured to detect such anti-scraping policies and restrictions and prevent what might be construed as improper extraction. Such restrictions, though, may prove to be less of a concern when extracting data from affiliated entities, partners, and the like, with whom the seller has an established business relationship regarding shared use of data.

Once the keyword and/or other external content 304 data is extracted, the association between those keywords and the offerings is stored in the seller's search engine database 322 and used for offering retrieval in response to search queries, thereby enriching entries, categories, and the like set forth in an online catalog or other repository of information. More particularly, in illustrative embodiments, the extracted keywords are used to define new product or service groupings or categories, and assign offerings in the seller's catalog to the new categories using machine learning algorithms, such as the one-shot learning algorithm. The disclosed systems and methods learn from a relatively small set of products and/or services listed on the third-party website and find one or more larger sets of similar items in the seller's catalog which can share the label. In other words, rather than exact matches being required, the extracted external content 304 may be applied to any offering in the seller's catalog which has one or more attributes sharing sort of similarity to the subject of the external content. This labeling process may be sampled and validated by human experts in the interest of further accuracy. Processing of keywords and key phrases on a trained neural network, as discussed herein, can expand their coverage and interpretations by the systems and methods. The machine learning may be implemented in a seller host device server module for purposes of finding common features.

In some embodiments, the extracted content 304 keywords and key phrases can be directly indexed, in a search index, and thereby used to expand, at search run time, a seller's search engine database 322 with respect to the entries to which the keywords pertain. Noun identifiers may be weighed preferably over articles and other grammar portions from the queries. In addition or alternatively, a seller may determine topics in the extracted keywords and filter or group them, thereby generating categories or labels for the relevant offering in the seller's catalog. Such categories and labels are useful in that, due to synonyms and superfluous verbiage, a prospective customer conducting a search of the catalog might not enter an existing seller keyword in his or her search. By no means exhaustive, this sort of categorization can include industry-critical concepts such as target audiences, use cases, product sizing, and product materials. The browsing structure for prospective customers can thereby be improved by the seller.

Optionally, one associating keywords may wish to group, match, or filter keywords and key phrases via a knowledge graph, to obtain a sense of what keywords might be worth indexing or which might be redundant (such as the terms "hiking" and "trekking"), and to generally get a stronger confidence "signal" as to relevant, distinct categories. In this vein, one approach involves a clustering algorithm to identify groups of words with the same meaning in the set of extracted keywords. An "off-the-shelf" clustering algorithm (such as k-nearest neighbors ("KNN"), density-based spatial clustering of applications with noise ("DBSCAN"), or affinity propagation ("AP") clustering) can be run on features such as word embeddings derived using models such as latent semantic indexing ("LSI"), word2vec, global vectors for word representation ("GloVe"), and the like. Clustering can then use feature vectors using various distance metrics like cosine similarity, Euclidean distance, or specifically-designed Word Mover's Distance (WMD) functions.

Another method to cluster keywords is by using a knowledge graph specifically in which entities have a set of known synonyms. For example, if the graph has an entity "hiking," one of its aliases may be "trekking," in which case it would be possible to group all keywords matching a known entity as a single set, and also extend the set with other aliases from the entity that were not included in the extracted keywords. The set can be further expanded by using graph embeddings (e.g., singular value decomposition ("SVD") and node2vec) to identify closely-related entities to those mentioned directly on the page (e.g., "camping" to "hiking"). The entities are candidates for creating new filtering categories, in order to avoid showing redundant options for refinement.

A seller may desire to improve search system recall through indexing keywords and generating categories for them. A fine-tuning stage in some illustrative embodiments essentially finds sets of similar product or service offerings, based on one or more of their attributes, and propagates identified keywords and categories, using supervised or unsupervised learning methods for increasing recall for search result purposes. For example, products grouped by category are, in all likelihood similar in one or more attributes or other ways, and can be examined by factors such as text, imagery, and related purchases/co-purchases, or any other signal that two products are similar or not similar. It should be noted that similarity criteria are often domain-specific in that, say, what attributes or factors make clothing offerings similar will not determine that electronic products are similar. Accordingly, it may be desirable, but is not necessary, to train category-specific models. That said, there certainly is room for propagation across multiple categories, such as by a theme. For example, an external web page titled "outdoor Christmas decorations," which lists a variety of product types (e.g., lights, tree ornaments, and props) can be used to thematically group the linked products. Once that external content is extracted and processed in the fashion herein, keywords such as "outdoor Christmas ornaments" can be shown as filtering options to customers browsing the seller's catalog.

More particularly, in some illustrative embodiments, it is possible to factor in all offerings in a seller's catalog, not just those identified as pertinent to a third-party web page. A similarity space is defined, over criterion data such as the ASINs, which can be computed from attributes and factors such as: co-purchases, either in the same order or within a certain time window, or embeddings of product descriptions and/or images generated using a convolutional autoencoder. This similarity space will take a pair of offerings and return a similarity value, on which clustering algorithms (again, such as KNN and DBSCAN) are applied in order to identify groups or subsets of similar products. For each cluster that includes a product or service with keywords extracted from third-parties, those keywords are propagated to the other offerings in the cluster. In other words, if product P1 appears in a cluster with products P2 and P3, and, if P1 was previously associated with keyword K1, then K1 is associated with P2 and P3 as well.

Among numerous other applications, the present systems and methods permit customers to find more products and/or services which are relevant to their shopping queries. For instance, customers who search for "Obama's summer reading list" could see results such as the memoir "Educated" by Tara Westover, because many web pages write about its inclusion on President Barack Obama's summer reading list, even though neither the publisher nor sellers included "Obama" and "summer reading list" among the keywords and key phrases for this book. Similarly, a search query "list of ingredients for chicken tikka masala" entered into an online e-commerce site may retrieve only a cookbook or perhaps an instructional video. The present systems and methods could be implemented to present a broader range of relevant products, such as "Ground Cumin, 4.5 oz." and "Boneless Skinless Chicken Breasts, 2 lbs. (frozen)," in response to an e-commerce site query directed to the dish chicken tikka masala.

A seller would choose to index keywords when it wants to increase the number of offerings displayed in response to a certain search query, sometimes referred to in the art as a "match set." Having output in the form of newly-indexed external content 304 keywords and key phrases, be they from crawling or direct retrieval from the web, new browsing categories or clusters may optionally be created for display to prospective customers. In short, the extracted keywords and key phrases can be organized into categories or topics, with each category or topic having a primary name as well as one or more aliases; this schema will serve to remove duplication, increase signal strength per keyword, and expand the match set for queries to which a seller offering directly answers.

Further, in various embodiments, a natural language processor may be utilized to compare individual words from the key phrases via word embedding. As will be understood, word embedding may convert individual words to a numerical value. These values may enable creation of word or phrase vectors in order to compare different phrases. It should be appreciated that the natural language processor may also be utilized to perform one or more processing or pre-processing steps at various points throughout the process. Some potential, non-limiting examples include word stemming, language identification, tokenization, word removal, decompounding, and the like. As noted, various embodiments implement deep learning technology for automatic enrichment of search query results. Within deep learning, sequence to sequence modeling uses a variety of recurrent neural networks such as, but not limited to, long short-term memory ("LSTM"). The clustering algorithm can be anything from a simple KNN (assuming regularized data) to an ensemble of algorithms. Similar to feature vectors, word vectors may be generated and applied in a machine learning phase when clustering from word embeddings. Phrase embedding, as opposed to the use of single words, is certainly within the scope of the present disclosure.

In the course of performing search query data enhancement, the seller may index key phrases and keywords directly as they are extracted or apply deterministic permutations, such as stemming and lemmatizing (i.e., in addition to "swimming," the keyword "swim" is indexed), introducing common typographical errors and variations known from search traffic (i.e., "swiming" for "swimming" or "i-phone" for "iPhone" (iPhone is a registered trademark of Apple, Inc.)). In the course of indexing, such as by ASIN, varying levels of processing can be performed to add one or more synonyms to the indexed keywords or key phrases. For example, knowing that the keywords "TV" and "television" have the same meaning, it is possible to cluster those keywords into a set. Shorter and longer forms of names can similarly be lumped together to yield more accurate search results. Local dialects and alternate spellings can also be considered when determining the clustering criteria. Here as well, a seller may wish to employ a knowledge graph to maximize use of extracted data, allowing both people and machines to better tap into the connections in the data sets. The seller may also desire to cluster-process keywords and key phrases in customer reviews and search queries on its own site in connection with the clustering of the extracted external data.

Additionally or alternatively, with the goal of further expanding search coverage while giving more search result-filtering control to the customer, a seller may wish to group the keywords by topic and index all data obtained through crawling and extraction. Should a seller provide categories or other navigation filters on its site, that can allow the prospective customer to refine a client device 302 search by easy selection action such as a mouse or touch pad click, and remove irrelevant offerings, without entering additional keywords. The seller would select a representative key phrase to serve as a topic for the set, and the topic may then be displayed on the seller's site as a navigational tool for the customer, filtering the results to narrow the results set.

As an alternative or in addition to use of a knowledge graph here, it is possible to index at least in part by metadata such as the ASIN, leading to conceptually-similar products being grouped in sets and/or subsets which technically might not otherwise be linked. For example, grouping by ASIN and applying/propagating the relevant extracted external content data and metadata could lead to a set of the same book or musical release in multiple formats which are each separate products from an ASIN standpoint (i.e., including newer and older versions and special editions in a set with the most-commonly found version). In an example application, the common textual features are determined by a machine learning algorithm of the module which determines similarity and/or semantic relationships between the query terms.

Figure 4:
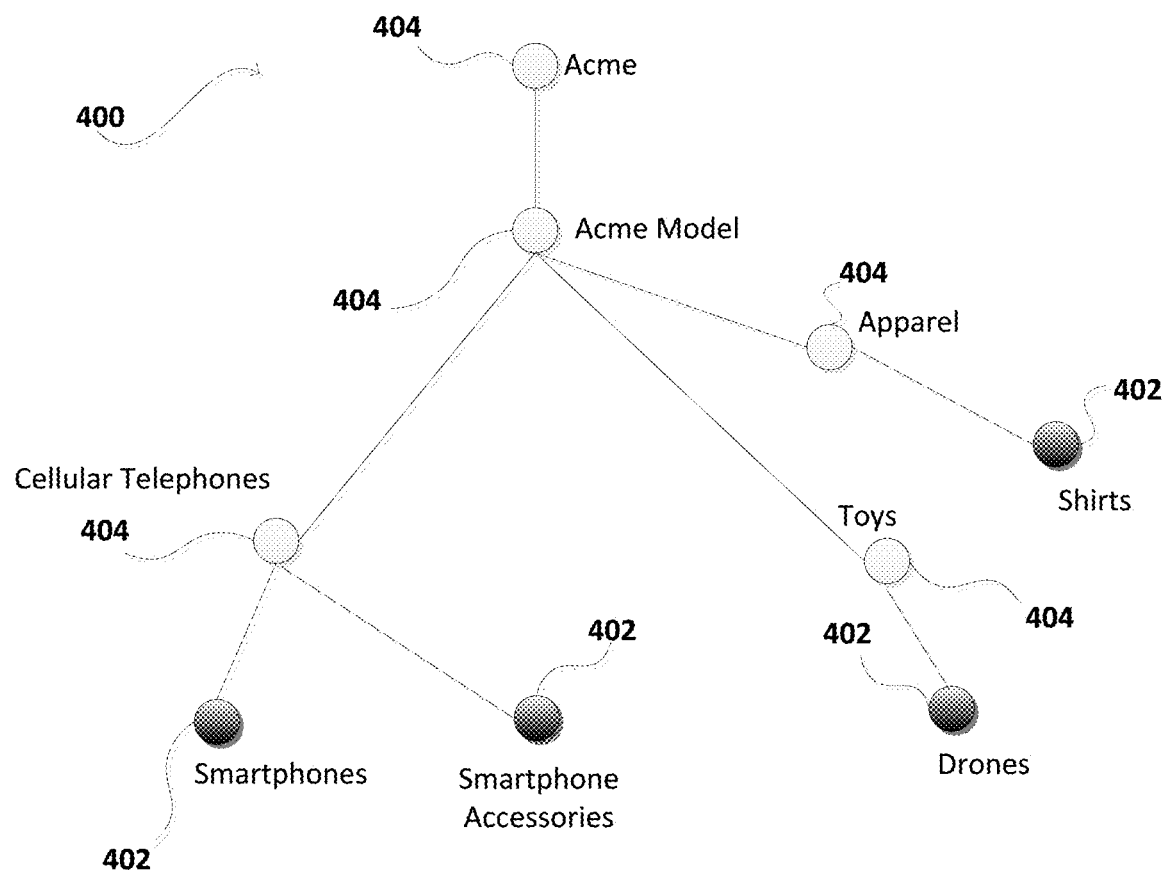
FIG. 4 illustrates an exemplary categorical hierarchy of items potentially related to a search query in accordance with various embodiments.

With regard to categorizing and indexing a subset of similar products, FIG. 4 illustrates a tree 400 showing a variety of different levels of categories and subcategories of a hierarchical organization. In this example, items are located within the browse tree based on their category. Each node of the browse tree may be associated with a category of items in a hierarchical manner. The hierarchical tree 400 of sample category nodes is in accordance with various embodiments for a search query "ACME MODEL ONE," as seen in FIG. 1. An online seller performing this sort of analysis for categorical indexing may wish to show higher-ranked category nodes as shaded circles 402 for emphasis. Other category nodes that are not identified as within a certain ranking could then be shown as unshaded circles 404.

As noted, identifiers may be ASINs, hyperlinks, Uniform Resource Identifiers (URIs), or Uniform Resource Locators (URLs). The identifiers determined as embedded in the external content 304 webpages are extracted and indexed in the search engine database 322 by the hyperlink retriever and indexer module 324. Also capable of being retrieved is at least a portion of the external content 304 (including information from webpages referenced by the hyperlink, such as text, image, video, or audio portions) which can be used to update the search engine database 322. The hyperlink retriever and indexer module 324 may retrieve and generate a ranking of search results for the client device 302 display content. The ranking of the search results may be by previous interactions received from prior searches within the website. The rankings can assist with a maximum number of results for one page of the display content, with the maximum number of results being configurable by the user to display more ranked results per page of the display content.

Figure 5:
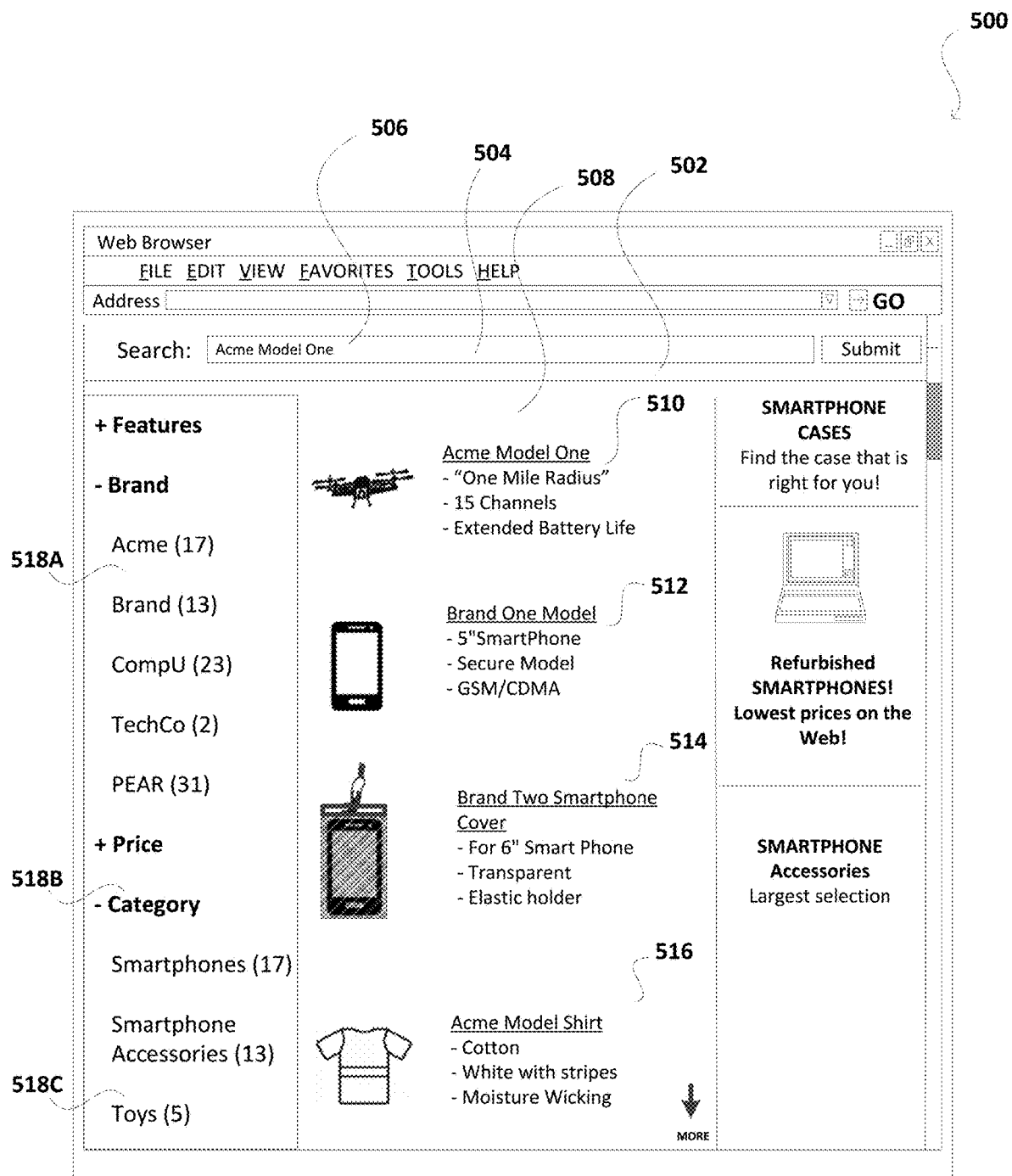
FIG. 5 illustrates another example of a window of display content that can be presented in accordance with various embodiments.

FIG. 5 illustrates another example 500 of a window of display content 502 that can be presented in accordance with various embodiments. This example, like the one in FIG. 1, utilizes an electronic marketplace as the representative content at issue, and the window may be a web browser or a stand-alone application for interacting with search result display content 502 of the marketplace. A user may search or also interact via a search field 504. A query 506 is provided in the search field 504 in one implementation of the searching or the interaction with display content. When the submit option is selected, the search may be initiated and processed on the computer or on a server as discussed in the implementations shown in FIGS. 2-3. In example 500, a query 506 for ACME MODEL ONE is entered into the search field 504, and the search results are provided in the results section 508 of the display content 502. As illustrated, there are four search results 510-516 on display, with an indication for more results (e.g., down arrow with text "MORE" at the bottom of the page or the scroll indicator on the right of the page) if the display content was scrolled down. Categories 518A-C within the search results can be presented on one side of the search results, while optional sponsored content may be displayed in another available area. Notably, search result 510 is a new item and category 518C is a new category, based on use of external content and an automated machine or manual learning, as discussed herein, of a new item type—DRONE—and the commonly used terms associated with DRONE (e.g., TOY).

Further, the search results may include an embedded hyperlink to a product information page that was retrieved per enhancement via external content and indexing of same stored in the search engine database 322 that is illustrated in FIG. 3. In addition, summary specifications for the new item may be provided under the item title, as extracted from the external content page of the underlying hyperlink.

In an example, the systems and methods of the disclosure herein are available to enrich searches and results presented to a client device in varying formats. For example, in audio-based or image-based searching, a similar manner as described above is applicable. Audio or images semantically similar, or the same as, the query audio or images are generated based on a search of indexed and/or cataloged content. Video searching is similarly possible using frames within the video, as portions of the video may be indexed based on searching of video-type external content, such as social media content and video news, for instance. In an example, audio-based searching may be based on text-to-audio read-back, where the text results are read-back with content identified as responsive to an audio-based query.

It will be seen that use of the present content search enrichment and refinement process additionally provides a solution to a network and computer-related issue of latency and traffic management for high-traffic networks. A user able to secure a specific match will not need to browse through multiple pages of search results or open multiple pages of product information from the search results. This reduces traffic to the content server (and related computing devices). This also reduces the workload to these devices and/or allows the devices to be used to perform other tasks. In addition, this also removes from any requirement to store search results for anticipated access when the system provides the query-specific search results in the first page, thereby alleviating storage issues as the content server processes query and retrieves data for numerous queries every second.

Another technical benefit realized in the use of the present disclosure is the ability to efficiently use display space in the user interface of the electronic marketplace or content display. The specific search results—those with content and categorization 518A-C pursuant to schema herein—may be provided in the designated areas of the display content as illustrated in FIG. 5. The user interface of the display content may also be dynamically modified in certain areas executing the appropriate dynamic script to indicate particular-relevant search results separately. Such areas can include, in addition, sponsored search results (e.g., paid content), including advertisements as to accessories for the new product. In an example, when a user is determined as connecting via a mobile device or using a connection deemed as limiting (e.g., cost-prohibitive or high loss/latency connections), it may be most efficient to provide the highest-ranking search results and/or search results based on newly-obtained external content. This may require dynamic modification of the display content in accordance with the latest developments and work of the seller's search engine.

Figure 6A:
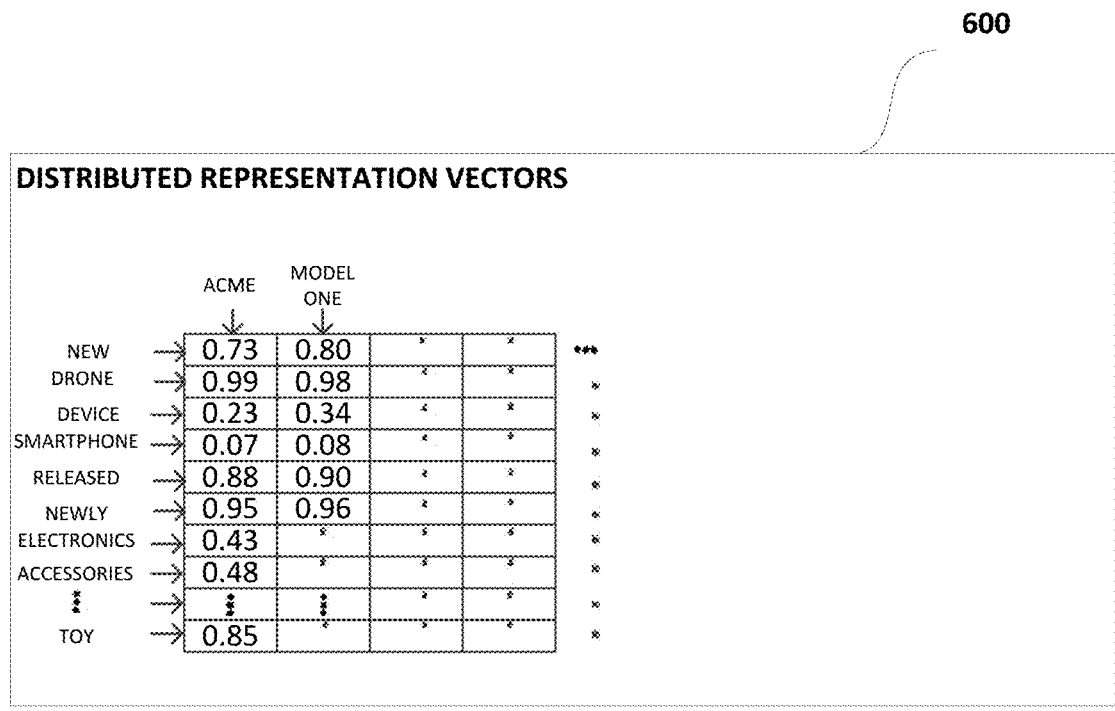
FIGS. 6A and 6B illustrate examples of semantic processing for machine learning in accordance with various embodiments.

In an implementation, the one-dimensional representation of a word may be prepared for the transformation to a multi-dimensional representation of words based on a matrix multiplication with a feature matrix. A feature matrix is composed of various values associated with unique features in text, and words with known relationships to other words may be a feature predefined in the feature matrix. The feature matrix may provide the word's relationship to other words forming the multi-dimensional representation. For example, using a single word's one-dimensional training vector, a neural network with a hidden layer and multiple related words may be trained to recognize the single word from multiple related words. In such an implementation, the back propagation of error and the feed-forward process may correct initial random values in the hidden layer to an accurate representation of a multi-dimensional vector for the word's relation to other words. In FIG. 6A, the words in the query of FIGS. 1 and 5 are provided in comparison with other words generally available in a database of terms through a multi-dimension vector. The distributed representation vectors 600 may represent one such implementation.

Word-to-word comparison may be performed, and may be extended to multiple words in a window. The training vector for a word may be multiplied with the feature vector to provide the feature representation. As the training vector for each word is a single row of multiple 0s and a single 1 entry, the resulting feature representation will be a single row of multiple columns of values. To find a relationship between words, two respective feature representations—one for each word—is multiple and fed to a classifier. In an example the classifier may be a softmax classifier which is a normalized function that marginalizes the largest value from the lower values in a provided input. As a result, highly-related words are classified in a manner to distinguish a lesser relationship word-pair.

For example, the multiplied values from the feature representations of word A with a word B may provide a singular value. A similar evaluation of word A may be performed with multiple words. Following this, the classifier may be applied to the collection of singular values to provide a vector distribution of the words associated with word A in different levels of closeness. The closeness demonstrates a sematic relationship from prior use of the words associated with word A. The vector distribution may represent a trained network which will be able to predict a word to output when the input word is word A, following from the above example. Considering the above application in a multi-dimensional plane, with multiple words and relationships, a trained neural network will be able to identify relationships based on the numerical values associated with words. As such, an input of two or three words allows the trained neural network to predict a word that is bears a relationship to both words. Such a trained neural network may also be designed to provide a level of closeness (semantic relationship or similarity) between words in a query.

Figure 6B:
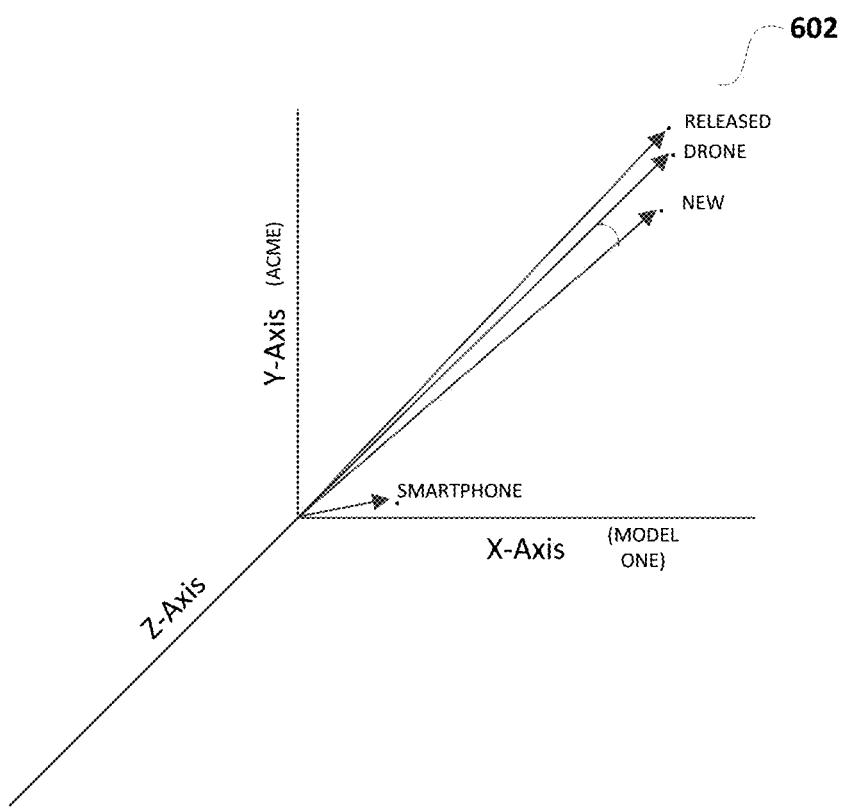

FIG. 6B illustrates another intermediate processing feature for applying external content for use in connection with search queries. When a trained neural network indicates that semantic relationships exists between terms in a query and terms in a database of terms, then the trained neural network may be configured to provide such information. In FIG. 6B, the information as to semantic relationships is provided in the form of a graph 602. The query words ACME and MODEL ONE are determined as related with respect to certain other commonly used words—e.g., DRONE, NEW, RELEASED, and TOY, as demonstrated in the feature matrix 600 of FIG. 6A. While the graph is provided to visualize distances between words as defined in their determined semantic relationships, it is understood that a configured system may not graph the relationships, but merely provide the outputs. As a result, the closest determined terms, by semantic relationships, may have the least distance as calculated by a cosine distance measure or a Euclidean distance measure—once normalized.

In an application of the above trained neural network, once a correlation of queries to find common textual features is completed, a further analysis is performed to determine semantic relationships between words in the retrieved content and the query terms. Finally, the example systems and processes herein may utilize one or more of the correlated words or phrases from the queries to represent common textual features. For example, the words ACME and RELEASED, having found to be semantically similar to other query terms, such as DRONE and TOY, it is most likely the case that a search query would seek a new item described by, and including, these words. As a result, external content having these words are likely to include hyperlinks to a product description of the new item.

Figure 7:
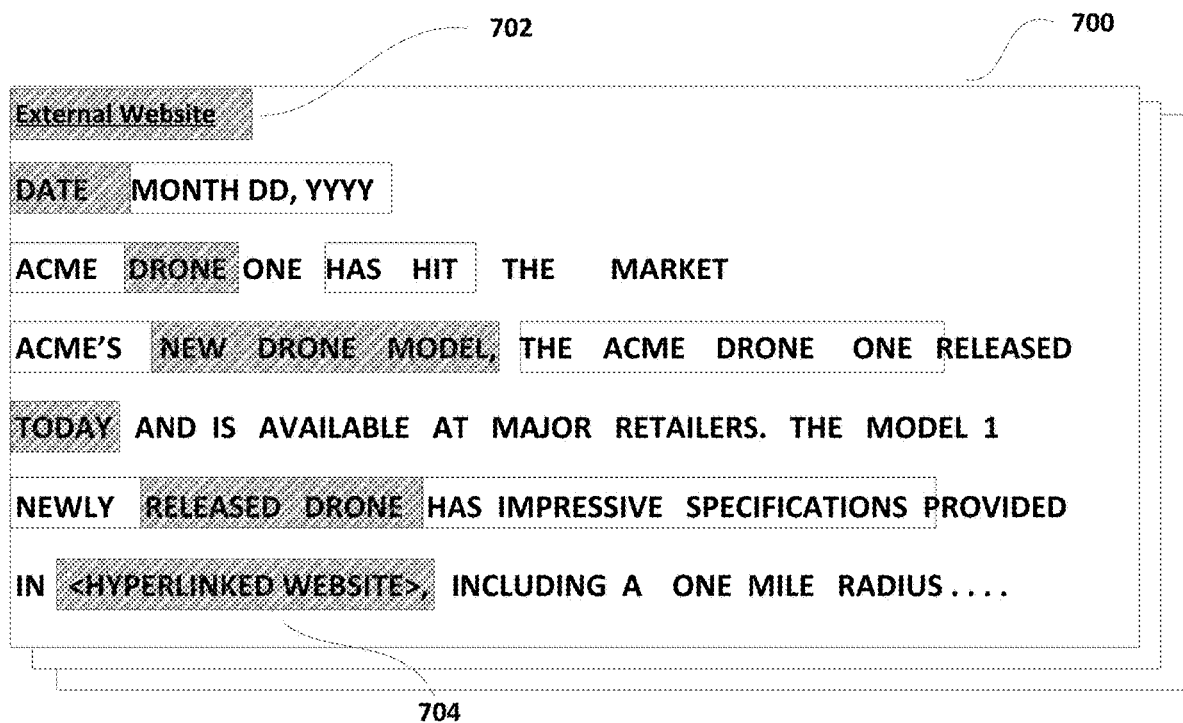
FIG. 7 illustrates examples of semantic processing for machine learning to determine common textual features found in external content in accordance with various embodiments.

FIG. 7 illustrates examples of semantic processing for machine learning to determine that common textual features from the queries are found in external content 700 in accordance with various embodiments. The machine learning of FIGS. 6A and 6B may be implemented in a host server module 312 to find the common textual features. The process in FIG. 7 is similar to word grouping, sample extraction, and training vector generation. The common textual features are found in external web page 702, and the content of the page 702 is further crawled to find embedded hyperlinks—e.g., hyperlink 704. The hyperlink is accessed and the underlying webpage from the hyperlink is also accessed and analyzed as discussed herein to determine the presence of applicable external content.

Figure 8:
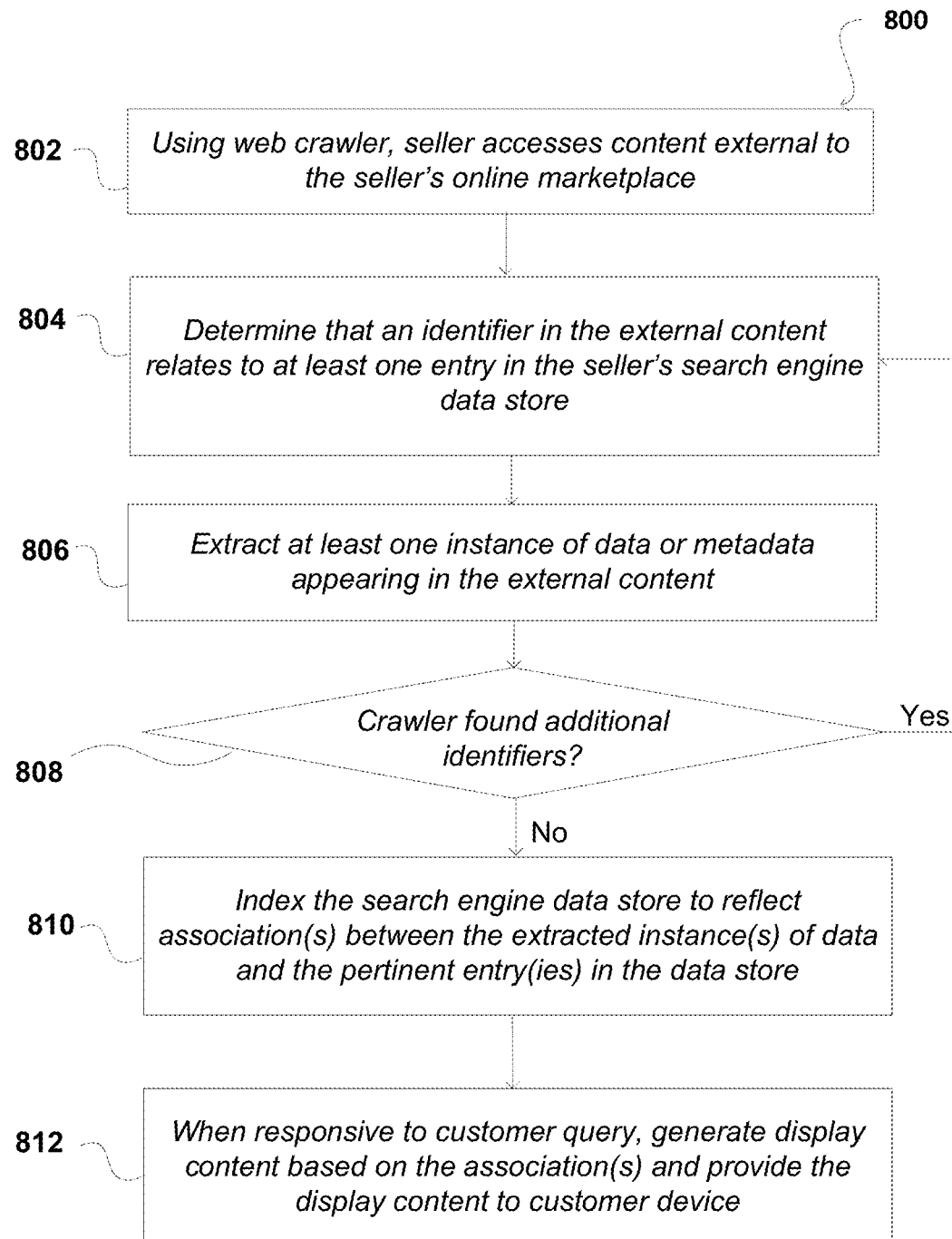
FIG. 8 illustrates an example process flow to configure a computing system of at least one processor for enhancing search query results with external content, in accordance with various embodiments.

FIG. 8 illustrates an example process flow 800 to configure and utilize a computing system, of at least a processor, for providing enhanced display content responsive to a search query, along the lines of the systems and techniques discussed above. It should be understood that, for this and all other processes discussed herein, there can be additional, alternative, or fewer steps performed in similar or alternate orders, or at least partially in parallel, within the scope of the various embodiments unless otherwise specifically stated. As shown, the example process 800 commences at step 802 with an online seller's use of a web crawler or other network navigation technique to access external content on a network. The third-party web pages are crawled or parsed for external content identifiers, such as hyperlinks or unique identifying codes such as ASINs. The systems and methods may be configured to index found hyperlinks and the related web pages or a summary of the external content contained therein; when found, the specific web page may be indexed first, then the content of the web page is further crawled to find embedded hyperlinks. At step 804, if and when such an identifier is found in the external content, the computing systems and methods determine whether the identifier relates to at least one entry in the seller's search engine database/data store. If such a relationship exists, pursuant to step 806, at least one instance of data or metadata appearing in the external content is extracted, as discussed herein. If, at decision step 808, it is determined that the crawler found additional identifiers, then the corresponding external content data is analyzed and may be extracted as well. If no further identifiers are found, at step 810, the search engine database is indexed to reflect associations between the extracted instances of data and the pertinent entries in the database. As noted, categorization also helps differentiate new items by their categories to avoid improper content discovery and the subsequent search results which would then likely be irrelevant to the customer. In addition, at some point in the process, verification may be performed to determine if the hyperlink is related to the article in a substantial manner. Finally, step 812 entails the seller's host device(s) generating display content, in the form of a query results list, that is based on the associations and providing the display content to a customer's client device when responsive to the customer's query. The results may be presented on the client device, for example, as seen in FIGS. 1 and 5.

Figure 9:
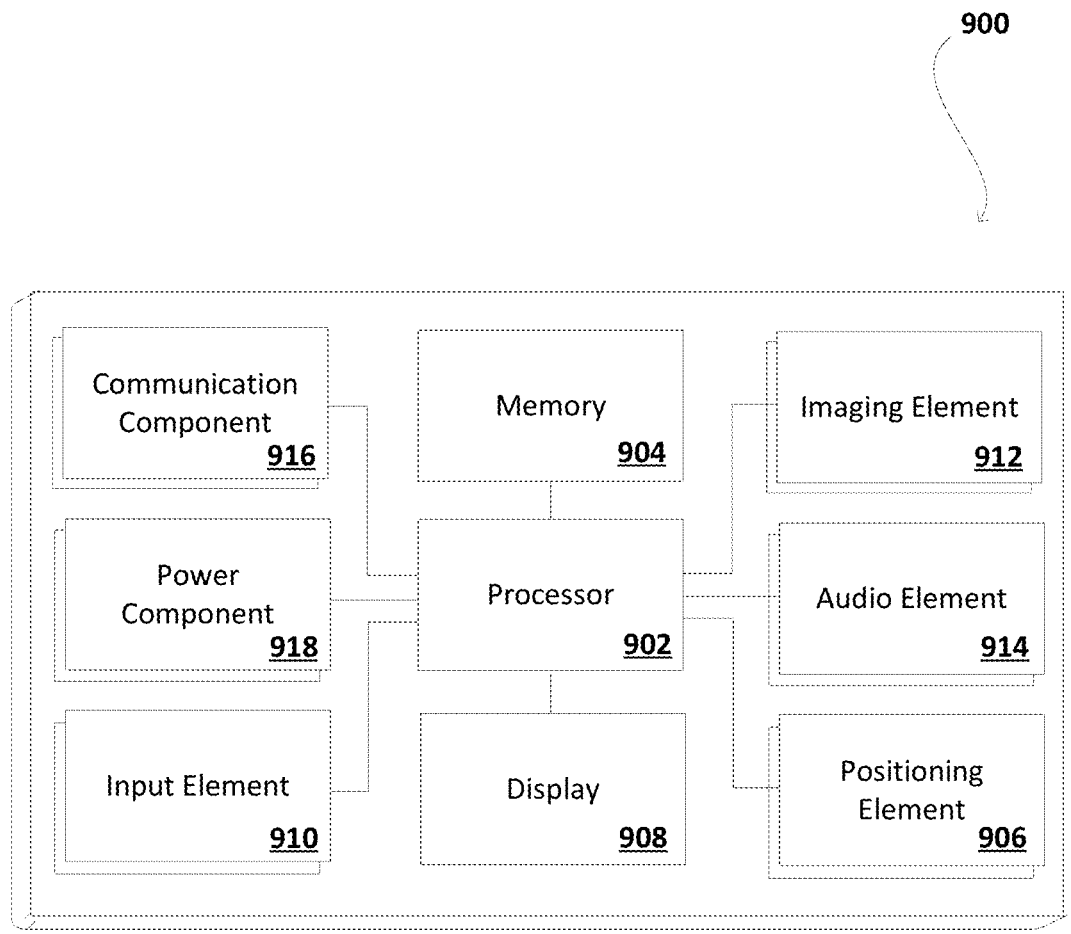
FIG. 9 illustrates example components of a computing device that can be utilized in accordance with various embodiments.

FIG. 9 illustrates a logical arrangement of a set of general components of an example computing device 900 that can be used to implement aspects of the various embodiments. In this example, the device includes a processor 902 for executing instructions that can be stored in a memory device or element 904. As would be apparent to one of ordinary skill in the art, the device 900 can include many types of memory, data storage, or non-transitory computer-readable storage media, such as a first data storage for program instructions for execution by the processor 902, a separate storage for images or data, a removable memory for sharing information with other devices, etc. The device may include a position element 906 to provide positioning for updated results based on geographic position of the device 900. The device 900 will most likely include some type of display element 908, such as a touch screen or liquid crystal display ("LCD"), although devices such as portable media players might convey information via other means, such as through audio speakers. As discussed, the device 900 in many embodiments will include at least one input element 910 that is able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device 900 might not include any buttons at all, and might be controlled only through a combination of visual and audio commands using imaging element 912 and audio element 914, such that a user can control the device without having to be in contact with the device. In some embodiments, the computing device 900 of FIG. 9 can include one or more network interface elements 916 for communicating over various networks, such as via Wi-Fi, Bluetooth, RF, wired, or wireless communication systems. The device 900 in many embodiments can communicate with a network, such as the internet using communication component 916, and may be able to communicate with other such devices using this same or a similar component. Such components 902-916 may be powered by power component 918 using internal power alone or in combination with an external power supply.

Example environments discussed herein for implementing aspects in accordance with various embodiments are primarily internet/web-based, as they relate to web services and cloud computing, but it should be appreciated that, although a web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, video game consoles, set-top boxes, personal data assistants, electronic book readers, and the like. The network can include any appropriate network, including the internet, an intranet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof using communication component 916.

It should be understood that there can be several application servers, layers, or other elements, processes, or components, which may be chained or otherwise configured, which can interact to perform tasks as discussed and suggested herein. As used herein the terms "database" and "data store" refer to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the search engine database as needed to execute aspects of one or more applications for the client device, handling a majority of the data access and business logic for an application. The application server provides access control services in cooperation with the database, and is able to generate content such as text, graphics, audio, and/or video to be transferred to the user, which may be served to the user by the web server in the form of HTML, XML, or another appropriate structured language in this example. The handling of all requests and responses, as well as the delivery of content between a client device and a resource, can be handled by the web server. It should be understood that web and application servers are not required and are merely example components, as structured code discussed herein can be executed on any appropriate device or host machine as discussed elsewhere herein.

A database or data store can include several separate data tables, databases, or other data storage mechanisms and media for storing data relating to a particular aspect. The database or data store is operable, through logic associated therewith, to receive instructions from a server, and obtain, update, or otherwise process data in response thereto. In one example, a user might submit a search request for a certain type of item. In this case, the database or data store might access the user information to verify the identity of the user and access the catalog detail information to obtain information about items of that type. The information then can be returned to the user, such as in a results listing on a web page that the user is able to view via a browser on the user device. Information for a particular item of interest can be viewed in a dedicated page or window of the browser.

Each server will include an operating system that provides executable program instructions for the general administration and operation of that server, and will include a non-transitory computer-readable medium storing instructions that, when executed by a processor of the server, allow the server to perform its intended functions. Suitable implementations for the operating system and functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service, such as a web service as may be part of a service-oriented architecture. Services such as web services can communicate using any appropriate type of messaging, such as by using messages in extensible markup language ("XML") format and exchanged using an appropriate protocol such as SOAP (derived from the "Simple Object Access Protocol"). Processes provided or executed by such services can be written in any appropriate language, such as the Web Services Description Language ("WSDL"). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. Again, the network can be, for example, a LAN, a WAN, a virtual private network, the internet, an intranet, an extranet, a public switched telephone network, an infrared network, a wireless network, and any combination thereof.

In embodiments utilizing a web server, the web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more web applications that may be implemented as one or more scripts or programs written in any programming language, such as Java®, C, C# or C++, or any scripting language, such as Perl, Python®, or Tool Command Language ("TCL"), as well as combinations thereof. The server(s) may also include database servers, including, without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one CPU, at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices will also include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as, but not limited to, volatile and non-volatile, removable and non-removable media implemented in any method or technology for storage of information such as computer-readable instructions, data structures, program modules, or other data, including RAM, ROM, EEPROM, flash memory or other memory technology, CD-ROM, digital versatile disk ("DVD") or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative, rather than a restrictive, sense. It will be evident that various modifications and changes may be made thereunto without departing from the broader spirit and scope of the invention as set forth in the claims.

What is claimed is:

1. A computer-implemented method, comprising:
   clustering a plurality of offerings in an online marketplace, the clustering performed at least in part by a knowledge graph;
   identifying, based on the clustering of the plurality of the offerings in the online marketplace, at least one subset of related offerings in the online marketplace;
   accessing first content external to the online marketplace having an interface, the interface appearing on a web page including hypertext and further configured to receive a query;
   performing at least one word embedding analysis on the first content to generate a context;
   determining that at least one identifier in the first content relates to at least one entry in a search engine data store for the online marketplace, the at least one identifier being a hyperlink or a unique identifying code for a product in the online marketplace;
   extracting at least one instance of data appearing in the first content, the extracted at least one instance of data including a keyword;
   propagating the keyword to entries in the search engine data store for the at least one subset of related offerings; and
   updating the search engine data store to reflect the context as well as an association between the extracted instance of data and the at least one entry.

2. The computer-implemented method of claim 1, wherein the at least one identifier is a hyperlink, and a predetermined amount of text surrounding the hyperlink comprises the extracted at least one instance of data.

3. A computer-implemented method, comprising:
   clustering a first set of entries in an online marketplace;
   applying at least one similarity criterion to the first set of entries to identify an applicable subset, the at least one similarity criterion based at least in part on attributes of the first set of entries;
   accessing first content external to a host device having a search engine and an interface, the interface configured to receive a query;
   performing at least one word embedding analysis on the first content to generate a context;
   determining that at least one identifier in the first content relates to at least one entry in the online marketplace;
   extracting at least one instance of data appearing in the first content;
   propagating the extracted instance of data to the subset; and
   updating the online marketplace to reflect the context as well as an association between the extracted instance of data and the at least one entry.

4. The computer-implemented method of claim 3, further comprising:
   presenting query results on a client device, the query results based on the association between the extracted instance of data and the at least one entry.

5. The computer-implemented method of claim 3, further comprising:

navigating a network using a web crawler, the network including a web page containing the first content.

6. The computer-implemented method of claim 3, wherein the extracted at least one instance of data is a keyword or key phrase.

7. The computer-implemented method of claim 6, further comprising:
locating the keyword or key phrase in the first content; and
matching the keyword or key phrase with product-identifying metadata in the first content.

8. The computer-implemented method of claim 7, further comprising:
training a neural network on a sample data set; and
applying the neural network to optimize determination of the association between the keyword or key phrase and the at least one entry.

9. The computer-implemented method of claim 3, wherein the at least one identifier is one of a unique character-based identifier or a hyperlink.

10. The computer-implemented method of claim 3, further comprising:
indexing, in the online marketplace, the at least one identifier and the extracted at least one instance of data.

11. The computer-implemented method of claim 3, wherein the clustering is performed at least in part by a knowledge graph.

12. A system, comprising:
at least one processor; and
a memory device including instructions that, when executed by the at least one processor, cause the system to:
cluster a first set of entries in an online marketplace;
apply at least one similarity criterion to the first set of entries to identify an applicable subset, the at least one similarity criterion based at least in part on attributes of the first set of entries;
access first content external to a host device having a search engine and an interface, the interface configured to receive a query;
perform at least one word embedding analysis on the first content to generate a context;
determine that at least one identifier in the first content relates to at least one entry in the online marketplace;
extract at least one instance of data appearing in the first content;
propagate the extracted instance of data to the subset; and
update the online marketplace to reflect the context as well as an association between the extracted instance of data and the at least one entry.

13. The system of claim 12, wherein the instructions, when executed by the at least one processor, further cause the system to:
navigate a network using a web crawler, the network including a web page containing the first content.

14. The system of claim 12, wherein the extracted at least one instance of data is a keyword or key phrase, and wherein the instructions, when executed by the at least one processor, further cause the system to:
locate the keyword or key phrase in the first content; and
match the keyword or key phrase with product-identifying metadata in the first content.

15. The system of claim 12, wherein the at least one identifier is one of a unique character-based identifier or a hyperlink, and wherein the instructions, when executed by the at least one processor, further cause the system to:
index, in the online marketplace, the at least one identifier and the extracted at least one instance of data.

16. The system of claim 12, wherein the instructions, when executed by the at least one processor, further cause the system to:
present query results on a client device, the query results based on the association between the extracted instance of data and the at least one entry.

* * * * *